United States Patent [19]

Gold

[11] Patent Number: 5,746,859

[45] Date of Patent: May 5, 1998

[54] STATIONARY MOTOR VEHICLE WINDOW

[76] Inventor: Peter Gold, 465 N. Wood Rd., Rockville Centre, N.Y. 11570

[21] Appl. No.: 772,773

[22] Filed: Dec. 24, 1996

[51] Int. Cl.$^6$ .................................. B60J 1/00; E06B 3/00
[52] U.S. Cl. ..................... 156/108; 156/71; 156/247; 296/201; 296/146.3; 52/208
[58] Field of Search ........................ 156/71, 108, 247, 156/293, 344; 296/200, 201, 146.15, 146.2, 146.3; 52/208

[56] References Cited

U.S. PATENT DOCUMENTS 5,330,597  7/1994  Leuchten et al. ............... 156/247 X
5,620,794  4/1997  Burkart et al. ................. 296/201 X Primary Examiner—Michael W. Ball
Assistant Examiner—Sam Chuan Yao
Attorney, Agent, or Firm—Myron Amer, PC

[57] ABSTRACT

A stationary rectangular-shaped auto window without any weather seal applied to its peripheral edge resulting in a window-enhancing gap in encircling relation about the window and, having as a substitute for the weather seal, a rectangular deposit of urethane inwardly of the rear surface of the window which seals water seepage through the gap and also holds the window firmly in place on a supporting flange.

2 Claims, 2 Drawing Sheets

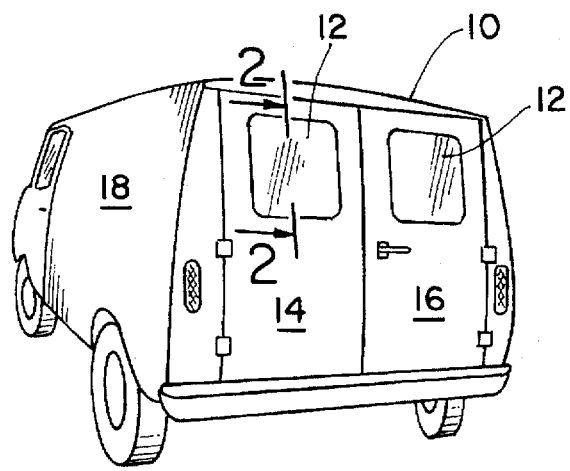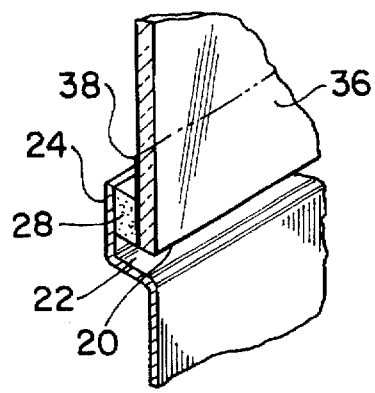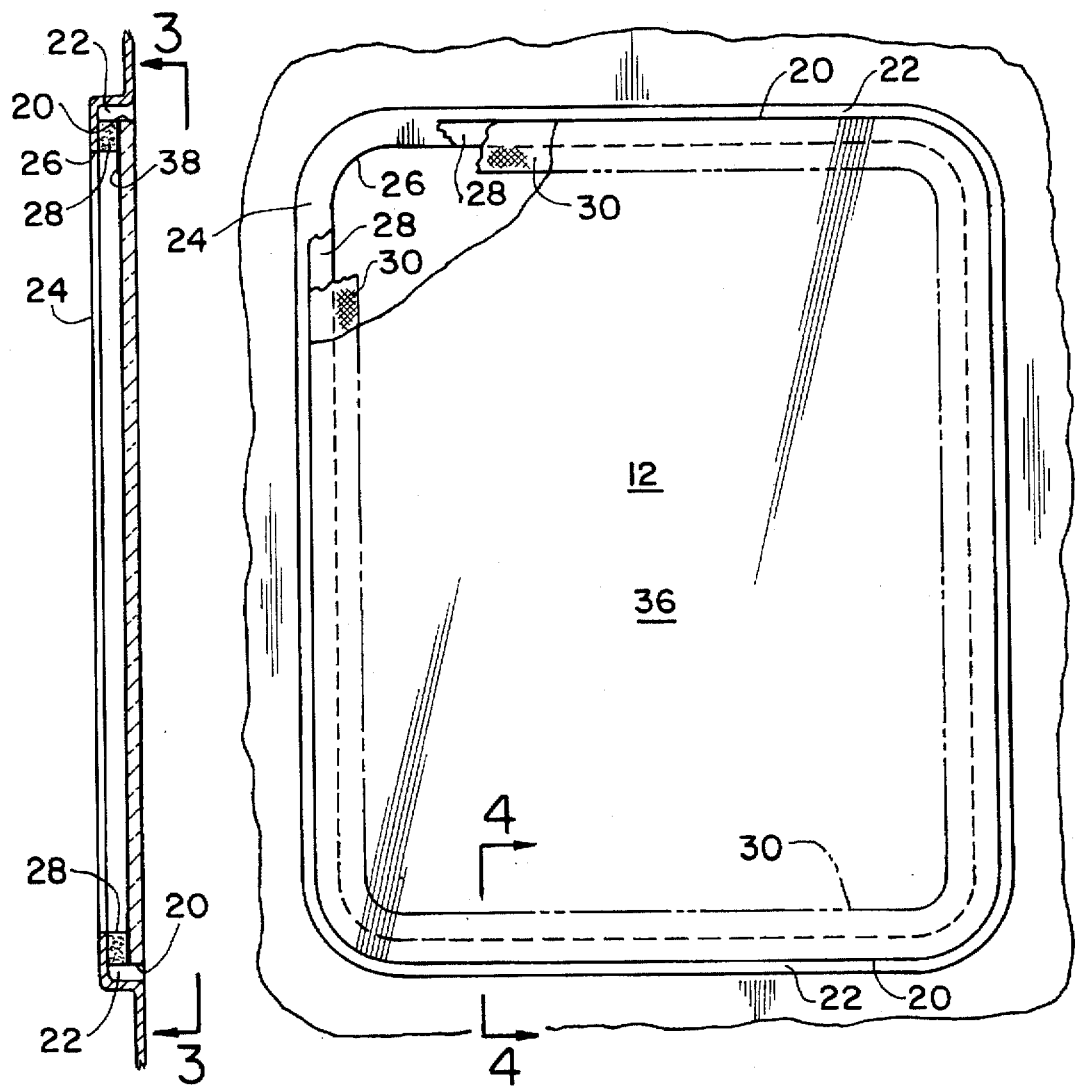
FIG.1　FIG.4　FIG.2　FIG.3

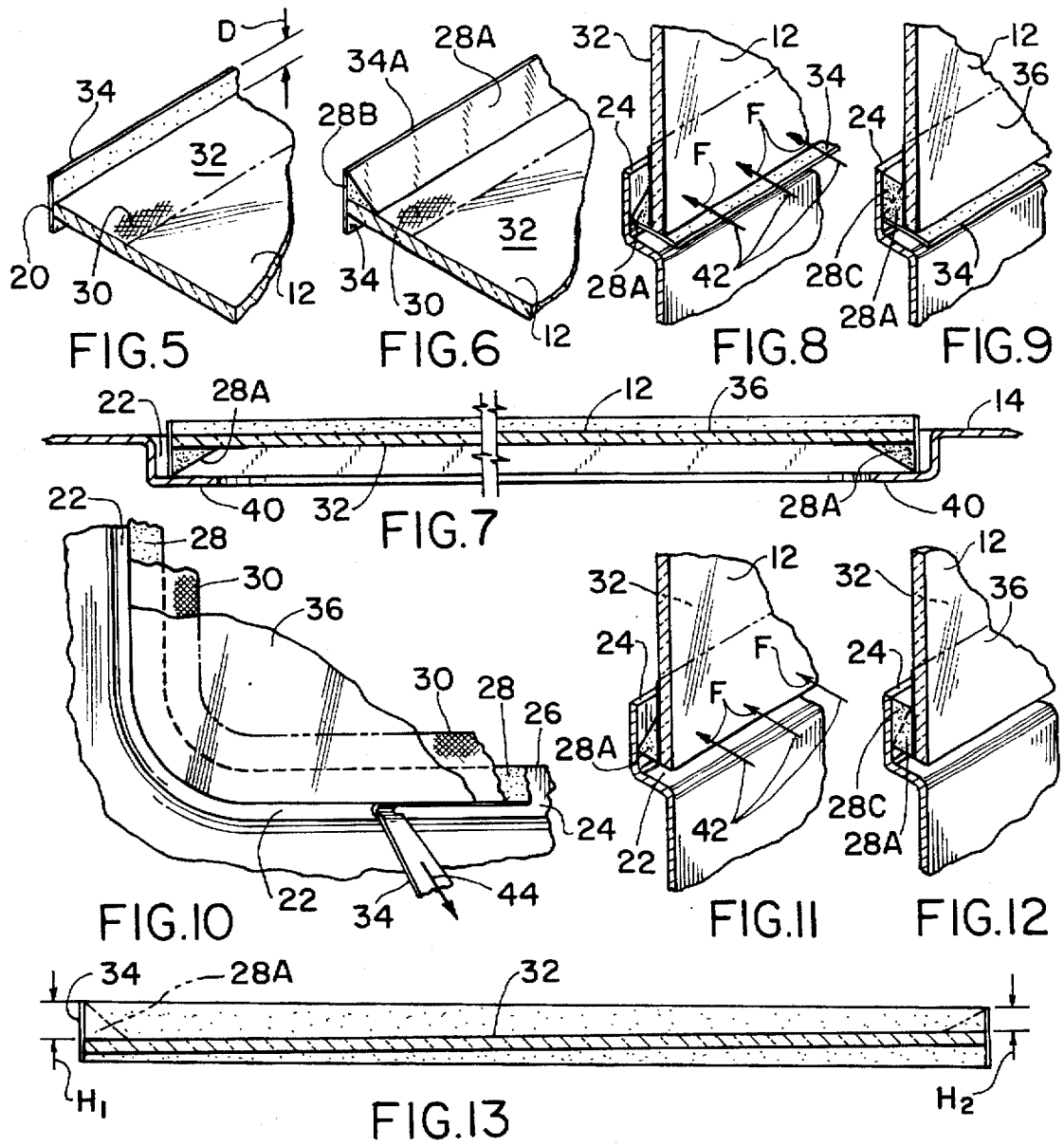

5,746,859

STATIONARY MOTOR VEHICLE WINDOW

The present invention relates generally to improvements to installed motor vehicle windows, the improvements, more particularly, contributing to an enhanced appearance in the installed window and also in significant simplification of the window-installing procedure

BACKGROUND OF THE INVENTION

It is common practice to use an adhesive in the sealing against weather elements penetration and the bonding in place of motor vehicle windows, particularly those windows in the rear doors of an industrial van. The adhesive of choice is urethane because of its ready application in a viscous state in an interposed position between a peripheral edge of the window and a window-supporting flange, and the curing of the urethane into a hardened state which firmly holds the window in covering relation over the window opening. It is also a common practice, heretofore followed without question, to attach an encapsulating structure to the peripheral edge of the window, either prior or subsequent to the urethane bonding, which encapsulating structure includes a crown to conceal the edge of the window and the adjacent body structure or panel and the space therebetween, or as otherwise stated to "finish" the space between the window and the body panel. Prior patents exemplifying this practice, both entitled "Molding Construction" are U.S. Pat. No. 4,950,019 issued to Michael G. Gross on Aug. 21, 1990 and U.S. Pat. No. 5,396,746 issued to Bruce F. Whitmer on Mar. 14, 1995.

The installed window, being already provided with a weather barrier seal and also bonded in place by the urethane, is believed unnecessarily provided with an edge-encapsulating structure, and the elimination thereof significantly simplifies the installation of the window as well as providing other noteworthy benefits.

SUMMARY OF THE INVENTION

Broadly, it is an object of the present invention to provide an installed van or other motor vehicle window overcoming the foregoing and other shortcomings of the prior art.

More particularly, it is an object to provide an installed van door or otherwise located window having an enhanced appearance and installed with minimum effort and attendant expense, all as will be better understood as the description proceeds.

BRIEF DESCRIPTION OF THE DRAWINGS

The description of the invention which follows, together with the accompanying drawings, should not be construed as limiting the invention to the example shown and described, because those skilled in the art to which this invention appertains will be able to devise other forms thereof within the ambit of the appended claims.

FIG. 1 is a perspective view of a van having installed stationary rear windows according to the present invention;

FIG. 2 is a cross sectional view, on an enlarged scale, as taken along line 2—2 of FIG. 1 illustrating installation structural details of the window;

FIG. 3 is a front elevational view of the within inventive window as seen in the direction of the arrows 3—3 of FIG. 2;

FIG. 4 is a partial perspective and cross sectional view of the window as seen along line 4—4 of FIG. 3.

The remaining FIGS. 5–10 illustrate preferred methods of preparing the window for its installation of FIGS. 1–4, wherein FIG. 5 is, like FIG. 4, a partial perspective and cross sectional view of the window and an edge-attached tape component;

FIG. 6 is a view similar to FIG. 5, but illustrating a subsequent window preparation step;

FIG. 7, like FIG. 2, illustrates installation structural details;

FIGS. 8 and 9 are partial perspective and cross sectional views illustrating, in sequence, the application of urethane in the bonding in place of the window;

FIG. 10 is a partial front elevational view illustrating a final step of removing the tape component from the installed window;

FIGS. 11 and 12 are almost duplicates of FIGS. 8 and 9, but with the tape component removed, and illustrating advantageous use of urethane as a functional substitute for the tape component; and FIG. 13 is a view similar to FIG. 7 but illustrating a variation in the installed condition of the window.

DESCRIPTION OF THE INVENTION

Prior patents relating to the installation of stationary vehicle windows in numbers too voluminous to make specific reference to, are cumulative in perpetuating the current practice of U.S. Pat. Nos. 5,396,746 of Mar. 14, 1995 and No. 4,950,019 of Aug. 21, 1990 of providing a molding, of plastic and/or rubber construction material, attached about the peripheral edge of the window to conceal or finish the space between the window and the body panel of a motor vehicle, as noted in the Abstracts of these patents.

Eschewing the practice noted, it is herein proposed to provide for a van 10 stationary windows 12, at least in the doors 14 and 16, and possibly in the sides 18, an installed condition which obviates an encapsulated peripheral edge, and consequently the attendant expense of fabricating and installing any edge-attached molding. Instead, each window 12 has an unencapsulated peripheral edge 20 so as to leave uncovered a gap 22 between the slightly undersized window 12 and the van body vertical flange wall 24 which bounds a slightly oversized window opening 26. A urethane deposit 28 applied inwardly and in encircling relation about the window peripheral edge 20 is applied initially in a viscous condition and, upon curing into a hardened state in a known manner, is effective in permanently bounding the window 12 in place. To mask the presence of the urethane 28 a black paint coating 30 is previously screened onto the window 12 so as to occupy an interposed position between the interior window surface 32 and the cured urethane 28.

Underlying the present invention is the recognition that the stationary condition of the window 12 renders unnecessary any weather barrier or similar functional need of an edge molding, and also that the open gap 22 significantly enhances the appearance of the window 12 over a less attractive deteriorating or scratched rubber or plastic molding.

Methods preferred for preparing the window 12 for the installed condition of FIGS. 1–4 are illustrated in FIGS. 5–13, to which reference should now be made.

As best shown in FIG. 5, an initial preparation step consists of providing a barrier, in the specific form of a tape 34 of plastic construction material, and thus chemically inert to urethane, in encircling relation about the peripheral edge 20 of the window 12, wherein the tape is of a selected width to extend a nominal distance, such as ¼ inch beyond what is the installed exterior window surface 36, to serve as a convenient grip for removing the tape, and extending in an opposite direction a greater distance, D, such as ⅞ inch beyond the interior window surface 32.

Tape 34 is adhesively attached to the window side edge 20 so as to be oriented in a transverse relation to the edge 20. Next, as shown in FIG. 6, using a so-called caulking gun-type device (not shown), a first amount of urethane 28A in a viscous state is deposited against the barrier tape 34 on the interior side of the window 12, preferably in a triangular configuration so that the base 28B of the urethane deposit is against the tape and contributes to supplementing a window-supporting function of the tape, as will be better understood subsequently. This is readily achieved using a rectangular slot as the exit aperture of the caulking gun device and orienting the exit slot at the appropriate angle to provide the triangular configuration to the urethane deposit 28A.

The combination tape/urethane deposit serves as an edge support 34, 28A for supporting the window 12 due to its depending relation from the window, when the window 12, as best shown in FIG. 7, is positioned within the window opening 26 bounded by the vertical flange 24 and the tape edge 34A is in supported contact with the horizontal flange 40.

Next, as shown in FIG. 9, a second amount of viscous urethane 28C is deposited, from the vantage point on the interior of the window opening 26, upon the first urethane deposit 28A, during which step care is taken to make sure that the deposited urethane makes contact with the flange and window surfaces 40 and 32, as identified in FIG. 8. Also to be noted, as illustrated in FIG. 8, are arrows F2 to be understood to indicate that if the window 12 is installed in a vertically oriented door 14, rather than a horizontally oriented door 14, as illustrated in FIG. 7, that appropriate brackets and the like (not shown) will support and apply force in the direction F to assist in the urethane bonding of the window 12 in place.

Also to be conveniently noted at this point in the description is FIG. 11 that is almost identical to FIG. 8 and thus designated by the same reference numbers used for the structural features identified in the description of FIG. 8. Missing, however, from FIG. 11 is the tape barrier 34, an omission that is optionally possible to exercise because the first urethane deposit 28A takes on the barrier function for the placement of the second urethane deposit 28C, as shown in FIG. 12.

More typically, however, the barrier tape 34 will be left in its attached condition about the periphery of the window 12 and, as best illustrated in FIG. 10, will be manually removed, as noted by the arrow 44, using to advantage the gap 22 between the undersized window 12 and oversized window opening 26, after the curing of the urethane 28 into its hardened condition. The barrier tape 34 readily releases from the window edge 20 because, as already noted, it is of a plastic construction material that is chemically inert to urethane. In practice, good results were achieved using a plastic tape with an adhesive surface sold under the trademark SUPER CLEAR by 3M Consumer Stationery Division of Saint Paul, Minn.

FIG. 13 illustrates a slightly varied installation condition of the window 12 in which using different heights H1 and H2 of urethane 28 at opposite sides, or at top and bottom of the window 12, the window will correspondingly assume an angular orientation dictated by the different heights H1, H2. Providing the different urethane heights H1, H2 is facilitated by adhering the barrier tape 34 to extend corresponding distances H1 and H2 beyond the interior window surface 32 since, as already noted, the barrier tape 34 is used as a guide in depositing the first amount or bead of urethane 28A, both as to the deposit site for the urethane 28 and also as to the height of the urethane deposited at the site.

While the stationary window herein shown and disclosed in detail, as well as the method of installing the window, are fully capable of attaining the objects and providing the advantages hereinbefore stated, it is to be understood that they are merely illustrative of the presently preferred embodiments of the invention and that no limitations are intended to the detail of construction or design herein shown other than as defined in the appended claims.

What is claimed is:

1. A method of installing a stationary window in a motor vehicle in the installation of which a slightly undersized window is bonded in place on a horizontally oriented flange in a slightly oversized window opening bounded by a vertically oriented flange extending outboard of said horizontally oriented flange and using urethane in an interposed position between a peripheral edge of said window and said horizontally oriented flange, said window installing method comprising the steps of providing a barrier in encircling relation about a peripheral edge of said window using a tape of urethane-inert construction material in adhesively attached relation oriented transversely of said window peripheral edge, depositing a first amount of urethane in a viscous condition on an interior surface of said window using said barrier as a guide to position said deposited urethane inboard and in adjacent position to said tape and window interior surface, establishing said tape and adjacent urethane deposit as an edge support for said window by orienting said edge support in depending relation to said window interior surface, supporting said window on said depending edge support upon said horizontally oriented flange within said window opening bounded by said vertically oriented flange, depositing a second amount of urethane upon said first urethane deposit effective to establish surface contact of said deposited urethane with said interior window surface and said horizontally oriented flange, and after curing of said urethane manually removing said tape serving as said barrier using the clearance provided by the oversized and undersized relation of said window opening and window, whereby said stationary window is permanently bonded in place with an enhanced appearance of an unencapsulated peripheral edge.

2. A method of installing a stationary window in a motor vehicle in the installation of which a slightly undersized window is bonded in place on a horizontally oriented flange in a slightly oversized window opening bounded by a vertically oriented flange extending outboard of said horizontally oriented flange and using urethane in an interposed position between a peripheral edge of said window and said horizontally oriented flange, said window installing method comprising the steps of providing a barrier in encircling relation about a peripheral edge of said window using a tape of urethane-inert construction material in adhesively attached relation oriented transversely of said window peripheral edge, depositing a first amount of urethane in a viscous condition on an interior surface of said window using said barrier as a guide to position said deposited urethane inboard and in adjacent position to said tape and window interior surface, establishing said tape and adjacent urethane deposit as an edge support for said window by orienting said edge support in depending relation to said window interior surface, supporting said window on said depending edge support upon said horizontally oriented flange within said window opening bounded by said vertically oriented flange, after curing of said urethane manually removing said tape serving as said barrier using the clearance provided by the oversized and undersized relation of said window opening and window, and depositing a second amount of urethane upon said first urethane deposit effective to establish surface contact of said deposited urethane with said interior window surface and said horizontally oriented flange, whereby said stationary window is permanently bonded in place with an enhanced appearance of an unencapsulated peripheral edge.

* * * * *